US012654148B2

(12) United States Patent
Wang et al.

(10) Patent No.: US 12,654,148 B2
(45) Date of Patent: *Jun. 16, 2026

(54) THERMALLY ACTIVATED BLEACHING CLAY PRODUCT FOR OIL BLEACHING

(71) Applicant: Active Minerals International, LLC, Sparks, MD (US)

(72) Inventors: Bo Wang, Union City, CA (US); Scott Kevin Palm, Reno, NV (US); Dennis Parker, Victor, ID (US)

(73) Assignee: Active Minerals International, LLC, Sparks, MD (US)

( * ) Notice: Subject to any disclaimer, the term of this patent is extended or adjusted under 35 U.S.C. 154(b) by 725 days.

This patent is subject to a terminal disclaimer.

(21) Appl. No.: 17/855,192

(22) Filed: Jun. 30, 2022

(65) Prior Publication Data

US 2023/0032214 A1    Feb. 2, 2023

Related U.S. Application Data

(63) Continuation-in-part of application No. 17/379,383, filed on Jul. 19, 2021, now Pat. No. 11,992,822.

(51) Int. Cl.
| | |
|---|---|
| B01J 20/12 | (2006.01) |
| A23D 9/04 | (2006.01) |

(Continued)

(52) U.S. Cl.
CPC ............... B01J 20/12 (2013.01); A23D 9/04 (2013.01); A23L 5/49 (2016.08); B01J 20/24 (2013.01);

(Continued)

(58) Field of Classification Search
CPC ...... B01J 20/12; B01J 20/24; B01J 20/28059; B01J 20/28061; B01J 20/28073;

(Continued)

(56) References Cited

U.S. PATENT DOCUMENTS

| | | | |
|---|---|---|---|
| 2,477,386 A | | 7/1949 | McCarter |
| 3,041,238 A | * | 6/1962 | Allegrini .................. A61K 9/14 |
| | | | 502/85 |

(Continued)

FOREIGN PATENT DOCUMENTS

| | | |
|---|---|---|
| AU | 2012318917 B2 | 12/2014 |
| BR | 102013013761 A2 | 6/2015 |

(Continued)

OTHER PUBLICATIONS

International Search Report & Written Opinion related to Application No. PCT/US2022/037169; reported on Dec. 8, 2022.

(Continued)

*Primary Examiner* — Erik Kashnikow
*Assistant Examiner* — Assaf Zilbering
(74) *Attorney, Agent, or Firm* — Merchant & Gould P.C.

(57) ABSTRACT

A product, a method of producing and a method of using are disclosed. The product comprises attapulgite that has been thermally activated. The product may have a permeability in oil in the range of 0.04-3 darcy and may have a surface area of 45-140 m²/g. The method of producing may comprise thermally activating a material that includes attapulgite by heating the material at a temperature in the range of 300 to 900° C. The method of decolorizing may include contacting for a contact time an oil with the bleaching clay product that comprises attapulgite that has been thermally activated, and separating the bleaching clay product from the oil to recover a decolorized oil that has a lower red color than the oil had prior to the contacting, and removing phosphorus and metals for hydrotreated vegetable oil (HVO)/renewable diesel feedstock pretreatment.

21 Claims, 5 Drawing Sheets

(51) Int. Cl.

| | |
|---|---|
| *A23L 5/49* | (2016.01) |
| *B01J 20/24* | (2006.01) |
| *B01J 20/28* | (2006.01) |
| *C10G 25/00* | (2006.01) |
| *C11B 3/10* | (2006.01) |

(52) U.S. Cl.
CPC ... *B01J 20/28059* (2013.01); *B01J 20/28061* (2013.01); *B01J 20/28073* (2013.01); *B01J 20/28076* (2013.01); *B01J 20/28085* (2013.01); *C10G 25/003* (2013.01); *C11B 3/10* (2013.01); *A23V 2002/00* (2013.01); *C10G 2300/1014* (2013.01); *C10G 2400/04* (2013.01)

(58) Field of Classification Search
CPC . B01J 20/28076; B01J 20/28085; A23L 5/49; A23D 9/04; A23V 2002/00; C10G 25/003; C10G 2300/1014; C10G 2400/04; C11B 3/10
See application file for complete search history.

(56) References Cited

U.S. PATENT DOCUMENTS

| | | | |
|---|---|---|---|
| 3,050,863 | A | 8/1962 | Allegrini et al. |
| 3,223,546 | A | 12/1965 | Hemstock |
| 5,004,570 | A | 4/1991 | Brooks et al. |
| 5,008,226 | A | 4/1991 | Taylor et al. |
| 5,008,227 | A | 4/1991 | Taylor et al. |
| 5,151,211 | A | 9/1992 | Brooks et al. |
| 5,869,415 | A | 2/1999 | Ortiz et al. |
| 5,908,500 | A | 6/1999 | Brooks et al. |
| 6,027,755 | A | 2/2000 | Henderson et al. |
| 6,365,536 | B1 | 4/2002 | Council et al. |
| 7,481,878 | B1 | 1/2009 | Perez-Cordova |
| 2008/0223756 | A1 | 9/2008 | Schurz |
| 2013/0302881 | A1 | 11/2013 | Bhaggan et al. |

FOREIGN PATENT DOCUMENTS

| | | | |
|---|---|---|---|
| BR | 102013013761 | B1 | 2/2020 |
| CA | 3073327 | A1 | 2/2019 |
| CN | 100563816 | C | 12/2009 |
| CN | 102225327 | B | 10/2012 |
| CN | 102847508 | B | 12/2013 |
| DE | 102005062955 | A1 | 7/2007 |
| EP | 0398636 | A1 | 11/1990 |
| WO | 2001085336 | A1 | 11/2001 |
| WO | 2015174820 | A1 | 11/2015 |
| WO | 2018156013 | A1 | 8/2018 |
| WO | 2020109468 | A1 | 6/2020 |

OTHER PUBLICATIONS

Felycia Edi Soetaredjo, et al., "Ecological-safe and low-cost activated-bleaching earth: Preparation, characteristics, bleaching performance, and scale-up production", Journal of Cleaner Production, vol. 279, Aug. 22, 2020, pp. 1-11.

Katiane C.M. Xavier, et al., "Thermally activated palygorskites as agents to clarify soybean oil", Applied Clay Science, vol. 119, Nov. 7, 2015, pp. 338-347.

Farihahusnah Hussin et al: "Textural characteristics, surface chemistry and activation of bleaching earth: A review", Chemical Engeneering Journal, Elsevier, Amsterdam, NL, vol. 170, No. 1, Mar. 14, 2011 (Mar. 14, 2011), pp. 90-106, XP028208609, ISSN:1385-8947, DOI: 10.1016/J.CEJ.2011.03.065 [retrieved on Mar. 25, 2011].

European Search Report in EP22846431.9 dated Jul. 28, 2025, 8 pages.

Micro-Sorb®, "Attapulgite Based Filtration", Lawrence Industries, https://www.I-i.co.uk/products/micro-sorb-basf-adsorbents (Feb. 10, 2021).

Excellence International F.Z.E., "Bleaching Clay (Fuller's Earth)", Excellence International Free Zone Establishment, http://www.eifzc.com/bleaching_clay.html (Oct. 17, 2020).

Bakri A. Kareem, et al., "Optimization of Natural Heat Treatment of Attapulgite: Effect on Rapeseed Oil Bleaching Process and Stability", International Journal of Engineering Research & Technology (IJERT), ISSN: 2278-0181, vol. 5 Issue 02, Feb. 2016, https://www.ijert.org/research/optimization-of-natural-heat-treatment-of-attapulgite-effect-on-rapeseed-oil-bleaching-process-and-stability-IJERTV5IS020277.

Katiane C. M. Xavier, et al., "Thermally activated palygorskites as agents to clarify soybean oil", Applied Clay Science, vol. 119, Part 2, Jan. 2016 , pp. 338-347, https://www.sciencedirect.com/science/article/abs/pii/S0169131715301642.

Yuanfa Liu, et al., "Adsorption Isotherms for Bleaching Soybean Oil with Activated Attapulgite", Journal of the American Oil Chemist's Society (JAOCS), Jan. 22, 2008, https://aocs.onlinelibrary.wiley.com/doi/epdf/10.1007/s11746-008-1278-y.

East Hony, "High Viscosity attapulgite clay powder", Qingdao Eastchem Inc., 2013, https://www.easthony.com/product/Attapulgite-Clay.html.

David D. Brooks, et al., "Optimization of Bleaching Process", AOCS Lipid Library, 2021, The American Oil Chemists' Society, https://lipidlibrary.aocs.org/edible-oil-processing/optimization-of-bleaching-process.

Akinwande B. Aishat, et al., "Effect of Activation on Clays and Carbonaceous Materials in Vegetable Oil Bleaching: State of Art Review", British Journal of Applied Science & Technology, ISSN: 2231-0843, 5(2): 130-141, 2015, Article No. BJAST.2015.013, Jun. 10, 2014, https://www.journalcjast.com/index.php/CJAST/article/download/6488/11523.

Grand View Research, "Increasing Oil Production To Boost Bleaching Clay Market", Bleaching Clay Industry Trends & Opportunities, https://www.grandviewresearch.com/research-insights/bleaching-clay-market-insights-enhanced-oil-production-to-boost-growth (Oct. 25, 2016).

Müs, Erref Önal, et al., "Maximum Bleaching of Vegetable Oils by Acid-activated Bentonite: Influence of Nanopore Radius", Adsorption Science & Technology, vol. 30, No. 1, Jun. 22, 2011, https://journals.sagepub.com/doi/pdf/10.1260/0263-6174.30.1.97.

Guangyan Tian, et al., "Carbon/Attapulgite Composites as Recycled Palm Oil-Decoloring and Dye Adsorbents", Materials, Dec. 17, 2017, https://www.ncbi.nlm.nih.gov/pmc/articles/PMC5793584/.

Eyüp Sabah, et al., "Sepiolite: An Effective Bleaching Adsorbent for the Physical Refining of Degummed Rapeseed Oil", Journal of the American Oil Chemist's Society (JAOCS), 2005, vol. 82, No. 12.

Palumbo Trading, "Bleaching & Adsorption", https://www.palumbotrading.it/en/bleaching-adsorption-e.html (Dec. 18, 2019).

NOSB National List Petition, Attapulgite as Bleaching Earth For Vegetable and Animals Oils, Apr. 30, 2009, Oil-Dri Coportation of America, https://www.ams.usda.gov/sites/default/files/media/Attapulgite%20Petition.pdf.

YCW, "Physical Refining—Bleaching", Oil Palm Knowledge Base, Dec. 26, 2015, https://oilpalmblog.wordpress.com/2015/12/26/physical-refining-bleaching/.

Oil Dri, "Product and Company Identification", Safety Data Sheet, Product Name: Pure-Flo B80 Bleaching Clay, Sep. 7, 2018, https://www.carbonchemistry.com/wp-content/uploads/2021/01/Carbon-Chemistry-PURE-FLO-B80-Bleaching-Clay.pdf.

Zouping Mingyuan Imp&Exp Trade Co., Ltd, "Hot Selling Attapulgite Bleaching Earth Chemical Powder Attapulgite Clay For Palm Oil Refined Red Color Decolorization", Pharmaceutical Intermediate DL-Serine, https://www.royalhotelbhb.com/hot-selling-attapulgite-bleaching-earth-chemical-powderattapulgite-clay-for-palm-oil-refined-red-color-decolorization_3171/ (Feb. 10, 2021).

Jie Tang, et al., "Attapulgite/carbon composites as a recyclable adsorbent for antibiotics removal", Key Laboratory of Clay Mineral Applied Research of Gansu Province, 2018, https://www.cheric.org/PDF/KJChE/KC35/KC35-8-1650.pdf.

* cited by examiner

SE     21-Aug-20          WD 6.6mm  20.0kV x25k   2um

SE     24-Aug-20          WD 6.3mm  20.0kV x25k   2um

THERMALLY ACTIVATED BLEACHING CLAY PRODUCT FOR OIL BLEACHING

CROSS REFERENCE TO RELATED APPLICATION

This application is a continuation-in-part of U.S. patent application Ser. No. 17/379,383, filed Jul. 19, 2021, now U.S. Pat. No. 11,992,822, the disclosure of which is incorporated herein by reference in its entirety.

TECHNICAL FIELD

The present disclosure generally relates to clay based products suitable for the bleaching of oil, and more particularly, activated clay based products for the bleaching of edible oil and non-edible oil, and for hydrotreated vegetable oil (HVO)/renewable diesel feedstock oil pretreatment.

BACKGROUND

Natural clays such as bentonite have been used as bleaching clays to remove color pigments/impurities from edible and non-edible oils. Some oils may have color that is undesirable to a consumer and may be bleached or decolorized to remove color pigments/impurities from the oil to obtain a desirable color of the oil.

Bleaching clays generally improve oil color by adsorbing color pigments such as carotenoids that are present. A bleaching clay with the highest bleaching efficiency (smallest dosage of bleaching material needed to produce a certain decolorization effect on a given amount of oil) is desirable because it results in cost reductions for refiners of oil. Purchasing and carrying costs are reduced when a smaller amount of clay is required for the decolorization process. Moreover, less spent bleaching clay is generated, which minimizes the loss of entrained bleached oil and spent bleaching clay disposal costs.

Natural clays are typically acid activated (processed through a chemical treatment such as contact with a mineral or organic acid) to improve their bleaching efficiency for decolorizing oils. Although acid activation does not improve the bleaching efficiency of all natural clays, activation of calcium bentonite with sulfuric acid has been utilized to improve the bleaching efficiency of calcium bentonite for decolorization of oil.

Bleaching clays with smaller particle sizes typically result in higher bleaching activity but lower throughput. Oil refiners, in choosing a bleaching clay are typically forced to compromise between getting the most decolorization per amount of bleaching clay versus processing speed.

U.S. Pat. No. 5,008,226, issued Apr. 16, 1991, (the '226 Patent) describes a process for making acid-activated bleaching earth from certain naturally occurring mixtures of calcium bentonite and attapulgite clay. The process involves treating such clay with low levels of activating acid which are mixed with the dried and ground clay, or spray dried from slurries containing the clay-acid mixture. Advantages include lower acid costs/unit mass of clay treated and lower production costs. While the disclosure of the '226 Publication may be beneficial, the disclosed bleaching composition still suffers from issues related to the use of acid activation such as undesirable amounts of soluble metals in the bleaching composition that may be transferred into the decolorized oil during processing. A better bleaching clay is desired.

SUMMARY OF THE DISCLOSURE

In another aspect of the disclosure, a bleaching clay product is disclosed, the bleaching clay product may comprise attapulgite that has been thermally activated. The bleaching clay product may have: (a) a permeability in oil in the range of 0.04-3 darcy, or 0.04-0.19 darcy, or 0.04-0.07 darcy, or 0.07-0.19 darcy, or 1-3 darcy, or 1.5-3 darcy; and (b) a surface area of 45-140 m$^2$/g or 80-140 m$^2$/g. In an embodiment, the attapulgite may be free of acid activation. In an embodiment, the attapulgite may be free of residual acid (acid-free). In an embodiment, the bleaching clay product may be free of acid activation. In an embodiment, the bleaching clay product may be free of residual acid (acid-free). In any one of the embodiments above, the bleaching clay product may have a bleaching efficiency for Lovibond red of 50%-99% at 1-3 wt. % bleaching clay product to oil and a contact time of 1-30 minutes for bleaching. In any one of the embodiments above, the attapulgite may be agglomerated (e.g., spray dried), with or without a binder, prior to thermal activation. In any one of the embodiments above, the bleaching clay product may have a permeability of 2-3 darcy, a bleaching efficiency for Lovibond red of 76-99%, and a porosity of 76-85% or 70-85%. In any one of the embodiments above, the bleaching clay product may have a pore volume of 1-3 mL/g or 1-2 mL/g. In any one of the embodiments above, the bleaching clay product may have no more than 4 parts per million (ppm) soluble lead as measured by the FCC, and has no more than 1 ppm arsenic as measured by FCC. In any one of the embodiments above, the bleaching clay product may have intrinsic pores in the range of 17-30 nanometers (nm) and/or inter pores in the range of 2-32 microns.

In one aspect of the present disclosure, a method of producing a bleaching clay product is disclosed. The method may comprise thermally activating a material that includes attapulgite by heating the material at a temperature to produce a bleaching clay product, the temperature in the range of 300 to 900° C. or 400 to 850° C., wherein the bleaching clay product has a permeability in oil in the range of 0.04-3 darcy, and may have a surface area of 45-140 m$^2$/g or 80-140 m$^2$/g. In an embodiment, the bleaching clay product may have no more than 4 ppm soluble lead as measured by the Food Chemical Codex (FCC) and no more than 1 ppm arsenic as measured by the FCC. In any one of the embodiments above, the attapulgite may be agglomerated (e.g., spray dried), with or without a binder, prior to thermally activating. In any one of the embodiments above, the bleaching clay product may have a bleaching efficiency for Lovibond red of 50% to 99% at 1-3 wt. % bleaching clay product to oil and a contact time of 4-8 minutes for bleaching. In any one of the embodiments above, the bleaching clay product may have intrinsic pores in the range of 17-30 nm and/or inter pores in the range of 2-32 microns.

In yet another aspect of the disclosure, a method for decolorizing an oil is disclosed. The method may comprise contacting for a contact time an oil with a bleaching clay product comprising attapulgite, the contact time in the range 4-8 minutes, wherein the attapulgite has been thermally activated, and separating the bleaching clay product from the oil to recover a decolorized oil that has a lower red color than the oil had prior to the contacting, wherein the bleaching clay product has a permeability in oil in the range of 0.04-3 darcy. In an embodiment, the oil may be an edible oil. In any one of the embodiments above, the oil and slurry may be combined into a slurry, the slurry 1-5 wt. % bleaching clay product to oil. In any one of the embodiments above, the bleaching clay product may have a surface area of 45-140 m$^2$/g or 80-140 m$^2$/g. In any one of the embodiments above, the red color is a Lovibond red and the bleaching clay product may have a bleaching efficiency of 50% to 99% for the Lovibond red. In any one of the embodiments above, the attapulgite has been agglomerated (e.g., spray dried), with or without a binder, prior to thermal activation. In any one of the embodiments above, the attapulgite that has been thermally activated may have a porosity of 70-85% and/or a pore volume of 1-2 mL/g. In any one of the embodiments above, the attapulgite that has been thermally activated may have a porosity of 79-85% and/or a pore volume of 1-2 mL/g. In any one of the embodiments above, the bleaching clay product may have a permeability in oil in the range of 0.04-0.19 darcy or 0.04-0.07 darcy or 0.07-0.19 darcy, or 1.5-3 darcy or 2-3 darcy. In any one of the embodiments above, the bleaching clay product may have no more than 4 ppm soluble lead or no more than 0.6 ppm soluble lead, as measured by the FCC, and/or has no more than 1 ppm soluble arsenic or no more than 0.06 ppm soluble arsenic as measured by the FCC. In any one of the embodiments above, the bleaching clay product may have intrinsic pores in the range of 17-30 nm and/or inter pores in the range of 2-32 microns.

In an aspect of the disclosure, a product is disclosed. The product may comprise attapulgite that has been thermally activated. The product may have: (a) a permeability in an oil in the range of 0.04-3 darcy; (b) a surface area of 45-140 $m^2/g$ or 80-140 $m^2/g$; (c) a removal efficiency in the oil for phosphorus of 50% to 100%; and (d) a removal efficiency in the oil for a metal of 50% to 100%. The product and/or the attapulgite may be acid-free or free of residual acid or free of acid activation, and the oil may comprise or is a feedstock oil for hydrotreated vegetable oil (HVO) or renewable diesel. In an embodiment, the product or the attapulgite may have a permeability in the range of 0.04-0.07 darcy or 0.04-0.19 darcy or 1-3 darcy or 1.5-3 darcy. In any one or more of the product, embodiments or refinements above, the metal may be or may include calcium, magnesium, potassium, copper, or iron. In any one or more of the product, embodiments or refinements above, the product may have a removal efficiency in the oil for peroxide of 50% to 100% and/or a removal efficiency in the oil for chlorophyll of 50% to 100% and/or a bleaching efficiency in the oil for Lovibond red of 65% to 100%. In any one or more of the embodiments or refinements above, the product may have a removal efficiency in the oil for phosphorus of 50% to 100% that leaves less than 2 ppm phosphorus content in the oil. In any one or more of the embodiments or refinements above, the product may have removal efficiency in the oil for the metal of 50% to 100% that leaves less than 10 ppm total metal content in the oil. In any one or more of the product, embodiments or refinements above, the attapulgite that has been thermally activated has a porosity of 70-85% and/or a pore volume of 1-2 mL/g. In any one or more of the product, embodiments or refinements above, the attapulgite that has been thermally activated may have a $d_{90}$ of 65-95 μm. In any one or more of the product, embodiments or refinements above, the product may have intrinsic pores in the range of 17-30 nm and/or inter pores in the range of 2-32 microns.

In another aspect of the disclosure, a method for treating an oil is disclosed. The method may comprise: contacting for a contact time the oil with a product comprising attapulgite, the contact time in the range 4-35 minutes, wherein the attapulgite has been thermally activated, wherein the product is free of residual acid; and separating the product from the oil to recover a treated oil, wherein the treated oil has a lower amount of phosphorus than the oil had prior to the contacting and has a lower amount of a metal than the oil has prior to the contacting, wherein further the treated oil has less than 0.5 parts per million (ppm) of phosphorus and less than 0.5 ppm of the metal; wherein the bleaching clay product has a permeability in oil in the range of 0.04-3 darcy, wherein the oil comprises a feedstock oil for hydrotreated vegetable oil (HVO) or renewable diesel. In an embodiment, the metal may include or may be calcium, magnesium, potassium, copper, or iron. In a refinement, the metal is calcium. In any one or more of the method, embodiments or refinements above, the treated oil has a lower amount of peroxide than the oil had prior to the contacting, wherein further the treated oil has 1-3 meq/kg peroxide value. In any one or more of the method, embodiments or refinements above, the treated oil has a lower amount of chlorophyll than the oil had prior to the contacting, wherein further the treated oil has 0-0.1 parts per million (ppm) of chlorophyll. In any one or more of the method, embodiments or refinements above, the treated oil has a lower red color than the oil had prior to the contacting. In a refinement, the red color is a Lovibond red and the product has a bleaching efficiency of 50% to 99% for Lovibond red. In any one or more of the method, embodiments or refinements above, the product may have a permeability in oil in the range of 0.04-0.19 darcy or 1.5-3 darcy or 2-3 darcy. In any one or more of the method, embodiments or refinements above, the contacting may be at a temperature of 80-125° C.

DETAILED DESCRIPTION

Figure 1:
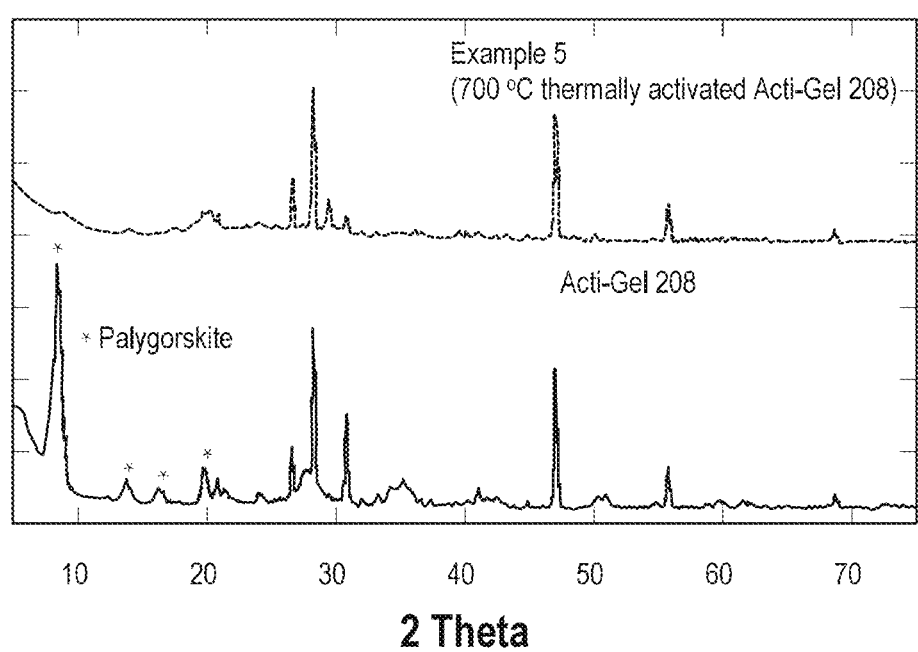
FIG. 1 is a graph of the X-ray diffraction (XRD) patterns of (1) attapulgite that has not been thermally activated (Acti-Gel 208®) and (2) attapulgite (Acti-Gel 208®) that has been thermally activated by heating at 700° C.

This disclosure relates to thermally activated clay products for oil bleaching: decolorizing and/or for HVO/renewable diesel feedstock oil pretreatment. The clay products disclosed herein comprise or may be attapulgite. Attapulgite is sometimes referred to as palygorskite. To avoid confusion, as used herein, the term "attapulgite" means attapulgite and/or palygorskite. As a preliminary matter, the permeability discussed herein relates to permeability in oil, not permeability in water. A material's permeability in oil is known by those of skill in the art to be different than the material's permeability in water.

The purpose of oil bleaching is typically to remove the color pigments and impurities contained in edible and non-edible oils. As discussed earlier, typically, acid activated bleaching clays (e.g., acid-activated bentonite) are used to adsorb the color pigments. Although such acid activated bleaching clays may be beneficial, the bleaching process time of such clays (and other clays) is relatively long because bleaching clays, including acid activated bleaching clays, have very low permeability in oil. Usually, permeability in oil is inversely related to the bleaching clay's bleaching efficiency as smaller particle sizes typically result in higher bleaching activity but lower permeability. Slow permeability is undesirable because it substantially lowers processing throughput rates. Oil refiners, in choosing a bleaching clay are typically forced to compromise between getting the most decolorization per amount of bleaching clay versus processing speed. Moreover, use of acid activated bleaching clays (e.g., calcium bentonite and the like) comes with other drawbacks as well such as undesirable amounts of soluble metals that may be transferred into the decolorized oil during processing.

Disclosed herein is a novel bleaching clay product that can be used as an adsorbent for oil bleaching (e.g., decolorizing) edible and/or non-edible oil. Besides removing color red and chlorophyll, the novel bleaching clay product disclosed herein also removes peroxide, phosphorus, metals and calcium very effectively in HVO/renewable diesel feedstock oil pretreatment. Such novel bleaching product has high permeability in oil (relative to other bleaching clays) and high bleaching efficiency, which significantly reduces bleaching process time. Edible oil may include, but is not limited to, vegetable oil and/or (edible) animal derived oil. Exemplary edible vegetable oil may include, but is not limited to, canola, coconut, corn germ, cottonseed, olive, palm, peanut, rapeseed, safflower, sesame seed, soybean, sunflower or mixtures thereof. Edible animal-derived oil may include, but is not limited to, lard, tallow, fish oil or mixtures thereof. Non-edible oil may include, but is not limited to, non-edible vegetable oil, non-edible animal-derived oil, petroleum derived oil, mineral oil, insulating oil(s), rolling oil(s), waste oil(s), lubricant(s), grease(s), or mixtures thereof. Non-edible vegetable oil may include, but is not limited to, soybean oil, rapeseed oil, sunflower oil, palm oil, jojoba oil, linseed oil, castor oil, feedstock oil for renewable diesel/HVO, or mixtures thereof. The feedstock oil for renewable diesel/HVO (also referred to as renewable diesel feedstock oil, HVO feedstock oil, renewable diesel/HVO feedstock oil) may comprise, but is not limited to, vegetable oil(s) (e.g., non-edible vegetable oil or edible vegetable oil or mixtures thereof), used cooking oil(s), animal fat(s), Distiller's Dried Grains with Solubles (DDGS) oil, acid oil(s), distillate(s), distillation pitch(es), sludge oil(s), or mixtures thereof. For example, the feedstock oil for renewable diesel/HVO may comprise soybean oil. Nonedible animal-derived oil may include, but is not limited to, low grade tallow, neat's-foot oil(s), or mixtures thereof.

In an embodiment, the bleaching clay product comprises attapulgite that has been thermally activated by heating. Such bleaching clay product may have a permeability in oil in the range of 0.04-3 darcy. In another embodiment, the bleaching product may further have a bleaching efficiency for Lovibond red of 50%-99%, 50%-95%, or up to 99%. In a further refinement, in any one of the embodiments above, the bleaching clay product may have a surface area of 45-140 m$^2$/g, or 100-140 m$^2$/g, or 80-140 m$^2$/g. In a further refinement, in any one of the embodiments/refinements above, the bleaching clay product may have a porosity of 70-90%, or 76-85%, or 79-85%, or 70-82%. In a further refinement, in any one of the embodiments/refinements above, the bleaching clay product may have a pore volume of 1-3 mL/g or 1-2 mL/g, or 1.4-2 mL/g, or 1.6-1.8 mL/g. In any one of the embodiments or refinements above, the attapulgite may be thermally activated by heating at a temperature in the range of 300-850° C., or 300-900° C., or 400-850° C. In any one of the embodiments or refinements above, the bleaching clay product may have intrinsic pores in the range of 17-30 nm and/or inter pores in the range of 2-32 microns.

In an embodiment, the bleaching clay product comprises attapulgite that has been thermally activated by heating. Such bleaching clay product may have a permeability in oil in the range of 0.04-3 darcy. In another embodiment, the bleaching product may further have a bleaching efficiency for Lovibond red of 50%-95% or up to 95%. In a further refinement, in any one of the embodiments above, the bleaching product may have a surface area of 50-140 m$^2$/g or 80-140 m$^2$/g. In a further refinement, in any one of the embodiments/refinements above, the bleaching clay product may have a porosity of 70-85% and/or a pore volume of 1.4-2 mL/g. In a further refinement, in any one of the embodiments/refinements above, the bleaching clay product may have a porosity of 76-85% and/or a pore volume of 1.4-2 mL/g. In any one of the embodiments or refinements above, the attapulgite may be thermally activated by heating at a temperature in the range of 300-900° C., or 300-850° C., or 600-850° C. In any one of the embodiments or refinements above, the bleaching clay product may have intrinsic pores in the range of 17-30 nm and/or inter pores in the range of 2-32 microns.

In an embodiment, the bleaching clay product comprises attapulgite that has been thermally activated by heating. Such bleaching clay product may have a permeability in oil in the range of 0.05-2.4 darcy. In another embodiment, the bleaching clay product may further have a bleaching efficiency for Lovibond red of 50%-90% or up to 90%. In a further refinement, in any one of the embodiments above, the bleaching clay product may have a surface area of 80-135 m$^2$/g. In a further refinement, in any one of the embodiments/refinements above, the bleaching clay product may have a porosity of 70-85% and/or a pore volume of 1.4-2 mL/g. In a further refinement, in any one of the embodiments/refinements above, the bleaching clay product may have a porosity of 76-85% and/or a pore volume of 1.4-2 mL/g. In any one of the embodiments or refinements above, the attapulgite may be thermally activated by heating at a temperature in the range of 400-850° C. In any one of the embodiments or refinements above, the bleaching clay product may have intrinsic pores in the range of 17-30 nm and/or inter pores in the range of 2-32 microns.

In an embodiment, the bleaching clay product comprises attapulgite that has been thermally activated by heating. Such bleaching clay product may have a permeability in oil in the range of 0.05-2.4 darcy. In another embodiment, the bleaching clay product may further have a bleaching efficiency for Lovibond red of 70%-90%, or 76% to 90% or up to 90%. In a further refinement, in any one of the embodiments above, the bleaching clay product may have a surface area of 115-135 m$^2$/g. In a further refinement, in any one of the embodiments/refinements above, the bleaching clay product may have a porosity of 70-85% and/or a pore volume of 1.4-2.0 mL/g. In a further refinement, in any one of the embodiments/refinements above, the bleaching clay product may have a porosity of 76-85% and/or a pore volume of 1.4-2.0 mL/g. In any one of the embodiments or refinements above, the attapulgite may be thermally activated by heating at a temperature in the range of 600-900° C. or 600-850° C. In any one of the embodiments or refinements above, the bleaching clay product may have intrinsic pores in the range of 17-30 nm and/or inter pores in the range of 2-32 microns.

In any one of the embodiments/refinements above, the attapulgite may be free of acid activation. As used here acid activation means contacting attapulgite with a mineral acid or an organic acid to improve surface area, porosity and surface acidity. Typical acid activation may include soaking the clay in a mineral or organic acid (e.g., sulfuric or hydrochloric acid) and then washing out the acid and leachable salts or impregnating the clay with the acid, without washing. In any one of the embodiments/refinements above, the attapulgite may be free of residual acid (may be acid-free). In any one of the embodiments/refinements above, the bleaching clay product may be free of acid activation. In any one of the embodiments/refinements above, the bleaching clay product may be free of residual acid (may be acid-free).

In any one of the embodiments/refinements above the bleaching clay product has a bleaching efficiency for Lovibond red at a loading of 0.5-10 wt. % bleaching clay product to oil and a contact time of 1-30 minutes for bleaching.

In any one of the embodiments/refinements above, the attapulgite may be spray dried or agglomerated with or without a binder prior to thermal activation or agglomerated during thermal activation.

In each of the embodiments/refinements above, the bleaching clay product may have: (a) no more than 4 ppm soluble lead as measured by the FCC (Food Chemicals Codex), or 0-4 ppm soluble lead as measured by the FCC, or less than 4 ppm soluble lead as measured by the FCC, or no more than 0.6 ppm soluble lead as measured by the FCC, or between 0-0.6 ppm soluble lead as measured by the FCC; and/or (b) no more than 1 ppm soluble arsenic as measured by the FCC, or 0-0.8 ppm soluble arsenic as measured by the FCC, or no more than 0.8 ppm soluble arsenic as measured by the FCC, or 0-0.8 ppm soluble arsenic as measured by the FCC.

In an embodiment, the attapulgite that has been thermally activated may have a $d_{90}$ of 65-95 μm and/or a $d_{50}$ of 25-35 μm and/or a $d_{10}$ of 5-15 μm.

In each of the embodiments/refinements above, the attapulgite is or may be thermally activated at a temperature and associated time duration at which collapse of the crystalline structure of the attapulgite does not occur.

In any one of the embodiments/refinements above, the attapulgite (after thermal activation): may be unsintered or free of sintered attapulgite particles; or may be substantially unsintered or substantially free of sintered attapulgite particles.

Disclosed herein is a novel product. The product may comprise attapulgite that has been thermally activated. The product may have: (a) a permeability in an oil in the range of 0.04-3 darcy; (b) a surface area of 45-140 m²/g or 80-140 m²/g; (c) a removal efficiency in the oil for phosphorus of 50% to 100%; and (d) a removal efficiency in the oil for a metal of 50% to 100%. The product and/or the attapulgite may be acid-free or free of residual acid or free of acid activation, and the oil may comprise or is a feedstock oil for hydrotreated vegetable oil (HVO) or renewable diesel.

In an embodiment, the product or the attapulgite may have a permeability in the range of 0.04-0.07 darcy or 0.04-0.19 darcy or 1-3 darcy or 1.5-3 darcy.

In any one or more of the product, embodiments or refinements above, the metal may be or may include calcium, magnesium, potassium, copper, or iron.

In any one or more of the product, embodiments or refinements above, the product may have a removal efficiency in the oil for peroxide of 50% to 100% and/or a removal efficiency in the oil for chlorophyll of 50% to 100% and/or a bleaching efficiency in the oil for Lovibond red of 65% to 100%.

In any one or more of the embodiments or refinements above, the product may have a removal efficiency in the oil for phosphorus of 50% to 100% that leaves less than 2 ppm phosphorus content in the oil.

In any one or more of the embodiments or refinements above, the product may have removal efficiency in the oil for the metal of 50% to 100% that leaves less than 10 ppm total metal content in the oil.

In any one or more of the embodiments or refinements above, the product may have removal efficiency in the oil for calcium of 50% to 100% that leaves less than 2 ppm calcium content in the oil.

In any one or more of the embodiments or refinements above, the product may have removal efficiency in the oil for chlorophyll of 50% to 100% that leaves less than 0.02 ppm chlorophyll content in the oil or less than 0.1 ppm of chlorophyll in the oil.

In any one or more of the product, embodiments or refinements above, the attapulgite that has been thermally activated has a porosity of 70-85% and/or a pore volume of 1-2 mL/g.

In an embodiment, the attapulgite that has been thermally activated may have a $d_{90}$ of 65-95 μm and/or a $d_{50}$ of 25-35 μm and/or a $d_{10}$ of 5-15 μm.

In any one or more of the product, embodiments or refinements above, the product may have intrinsic pores in the range of 17-30 nm and/or inter pores in the range of 2-32 microns.

In each of the embodiments/refinements above, the attapulgite is or may be thermally activated at a temperature and associated time duration at which collapse of the crystalline structure of the attapulgite does not occur.

In any one of the embodiments/refinements above, the attapulgite (after thermal activation): may be unsintered or free of sintered attapulgite particles; or may be substantially unsintered or substantially free of sintered attapulgite particles.

Disclosed herein is a novel method for treating an oil. The method may comprise: contacting for a contact time the oil with a product comprising attapulgite, the contact time in the range 4-35 minutes, wherein the attapulgite has been thermally activated, wherein the product is free of residual acid; and separating the product from the oil to recover a treated oil, wherein the treated oil has a lower amount of phosphorus than the oil had prior to the contacting and has a lower amount of a metal than the oil has prior to the contacting, wherein further the treated oil has (a) less than 2 parts per million (ppm) of phosphorus or less than 0.5 ppm of phosphorus and (b) less than 10 ppm of total metal content or less than 0.5 ppm of the metal; wherein the bleaching clay product has a permeability in oil in the range of 0.04-3 darcy, wherein the oil comprises a feedstock oil for hydrotreated vegetable oil (HVO) or renewable diesel.

In an embodiment, the metal may include or may be calcium, magnesium, potassium, copper, iron or mixtures thereof. In a refinement, the metal includes or is calcium. In a further refinement, the treated oil may have less than 2 parts per million (ppm) of calcium content or less than 0.5 ppm calcium content.

In any one or more of the method, embodiments or refinements above, the treated oil may have a lower amount of peroxide than the oil had prior to the contacting. In a refinement, the treated oil may have 1-3 meq/kg peroxide value.

In any one or more of the method, embodiments or refinements above, the treated oil may have a lower amount of chlorophyll than the oil had prior to the contacting. In a refinement, the treated oil may have 0 to 0.1 parts per million (ppm) of chlorophyll or may have 0 to less than 0.02 ppm of chlorophyll.

In any one or more of the method, embodiments or refinements above, the treated oil may have a lower red color than the oil had prior to the contacting. In a refinement, the red color is a Lovibond red and the product may have a bleaching efficiency of 50% to 99% for Lovibond red.

In any one or more of the method, embodiments or refinements above, the product may have a permeability in oil in the range of 0.04-0.19 darcy or 1.5-3 darcy or 2-3 darcy.

In any one or more of the method, embodiments or refinements above, the contacting may be at a temperature of 80-125° C.

In any one or more of the product, embodiments or refinements above, the attapulgite that has been thermally activated has a porosity of 70-85% and/or a pore volume of 1-2 mL/g.

In any one of the embodiments or refinements above, the bleaching clay product may have intrinsic pores in the range of 17-30 nm and/or inter pores in the range of 2-32 microns.

In each of the embodiments/refinements above, the attapulgite is or may be thermally activated at a temperature and associated time duration at which collapse of the crystalline structure of the attapulgite does not occur.

In any one of the embodiments/refinements above, the attapulgite (after thermal activation): may be unsintered or free of sintered attapulgite particles; or may be substantially unsintered or substantially free of sintered attapulgite particles.

Preparation of the Product

The method of producing the products discussed above may comprise thermally activating a material that includes (or is) attapulgite to produce a product that has a permeability in oil in the range of 0.04 to 3 darcy.

In one embodiment of the method, the thermally activating may include heating the material in a muffle furnace, or the like, at a temperature in the range of 300 to 850° C. or 300 to 900° C. for a duration of 15 to 50 minutes. In a refinement of the method or embodiment thereof, the product produced by such thermal activation may further have: (a) a bleaching efficiency for Lovibond red of 50%-99%, or 50%-95%, or up to 99%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50%-99%, or 70%-100%, or up to 100%; and/or (e) a removal efficiency for peroxide of 40%-80%, 50%-70%, or 55%-70%, or up to 70%. In a further refinement of the method, embodiment or any one of the refinements thereof, the product may have a surface area of 45-140 m²/g or 100-140 m²/g or 80-140 m²/g. In a further refinement of the method, embodiment or any one of the refinements thereof, the product may have a porosity of 70-90%, or 76-85% or 70-82%. In a further refinement, in any one of the embodiments/refinements above, the product may have a pore volume of 1-3 mL/g, or 1-2 mL/g, or 1.4-2 mL/g, or 1.6-1.8 mL/g. In any one of the embodiments or refinements above, the product may have intrinsic pores in the range of 17-30 nm and/or inter pores in the range of 2-32 microns.

In another embodiment of the method, the material may be thermally activated to produce a product that has a permeability in oil in the range of 0.04 to 3 darcy by heating the material in a muffle furnace, or the like, at a temperature in the range of 300-750° C. or 300-800° C. for a duration of 20 to 45 minutes. In a refinement of the method or embodiment thereof, the product produced by such thermal activation by may further have: (a) a bleaching efficiency for Lovibond red of 50%-95% or up to 95%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50%-99%, or 70%-100%, or up to 100%; and/or (e) a removal efficiency for peroxide of 40%-80%, 50-70%, or 55-70%, or up to 70%. In a further refinement of the method, embodiment or any one of the refinements thereof, the bleaching product may have a surface area of 50-140 m²/g or 80-140 m²/g. In a further refinement of the method, embodiment or any one of the refinements thereof, the bleaching clay product may have a porosity of 70-85% or 76-85%. In a further refinement of the method, embodiment or any one of the refinements thereof, the bleaching clay product may have a pore volume of 1.4-2 mL/g. In any one of the embodiments or refinements above, the bleaching clay product may have intrinsic pores in the range of 17-30 nm and/or inter pores in the range of 2-32 microns.

In another embodiment of the method, the material may be thermally activated to produce a product that has a permeability in oil in the range of 0.5 to 2.4 darcy by heating the material in a muffle furnace, or the like, at a temperature in the range of 400-850° C. for a duration of 20 to 40 minutes. In a refinement of the method or embodiment thereof, the product produced may further have: (a) a bleaching efficiency for Lovibond red of 50%-90% or up to 90%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50-99%, or 70%-100%, or up to 100%; and/or (e) a removal efficiency for peroxide of 40%-80%, 50%-70%, or 55%-70%, or up to 70%. In a further refinement of the method, embodiment or any one of the refinements thereof, the product may have a surface area of 80-135 m²/g. In a further refinement, of the method, embodiment or any one of the refinements thereof, the bleaching clay product may have a porosity of 76-85% or 79-82%. In a further refinement of the method, embodiment or any one of the refinements thereof, the bleaching clay product may have a pore volume of 1.4-2 mL/g. In any one of the embodiments or refinements above, the product may have intrinsic pores in the range of 17-30 nm and/or inter pores in the range of 2-32 microns.

In another embodiment of the method, the material may be thermally activated to produce a product that has a permeability in oil in the range of 0.05 to 2.4 darcy by heating the material in a muffle furnace, or the like, at a temperature in the range of 600-850° C. for a duration of 20 to 35 minutes. In a refinement of the method or embodiment thereof, the product produced may further have: (a) a bleaching efficiency for Lovibond red of 70%-90%, or 76% to 90% or up to 90%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50%-99%, or 70%-100%, or up to 100%; and/or (e) a removal efficiency for peroxide of 40%-80%, 50%-70%, or 55%-70%, or up to 70%. In a further refinement of the method, embodiment or any one of the refinements thereof, the product may have a surface area of 115-135 $m^2$/g. In a further refinement of the method, embodiment or any one of the refinements thereof, the product may have a porosity of 76-85% or 79-82%. In a further refinement of the method, embodiment or any one of the refinements thereof, the product may have a pore volume of 1.4-2 mL/g. In any one of the embodiments or refinements above, the product may have intrinsic pores in the range of 17-30 nm and/or inter pores in the range of 2-32 microns.

In another embodiment of the method, the material may be thermally activated to produce a product that has a permeability in oil in the range of 2 to 2.4 darcy by heating the material at a temperature in the range of 695-750° C. for a duration of 28 to 32 minutes. In a refinement of the method or embodiment thereof, the product produced may further have: (a) a bleaching efficiency for Lovibond red of 70%-82%, or 76% to 82% or up to 82%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50%-99%, or 70%-100%, or up to 100%; and/or (e) a removal efficiency for peroxide of 40%-80%, 50%-70%, or 55%-70%, or up to 70%. In a further refinement of the method, embodiment or any one of the refinements thereof, the product may have a surface area of 118-127 $m^2$/g. In a further refinement of the method, embodiment or any one of the refinements thereof, the product may have a porosity of 78-82%. In a further refinement of the method, embodiment or any one of the refinements thereof, the product may have a pore volume of 1.4-2 mL/g. In any one of the embodiments or refinements above, the product may have intrinsic pores in the range of 17-30 nm and/or inter pores in the range of 2-32 microns.

In another embodiment of the method, the material may be thermally activated to produce a product that has a permeability in oil in the range of 0.04 to 0.19 darcy or 0.04 to 0.07 darcy by heating the material at a temperature in the range of 400-850° C. for a duration of 28 to 32 minutes. In a refinement of the method or embodiment thereof, the product produced may further have: (a) a bleaching efficiency for Lovibond red of 70%-99%, or 70%-95% or up to 99%; and/or (b) a removal efficiency for phosphorus of 50%-100%, 70%-100%, or 70%-99%, or up to 100%; and/or (c) a removal efficiency for calcium of 50%-100%, 70%-100%, or 70%-99%, or up to 100%; and/or (d) a removal efficiency for chlorophyll of 50%-100%, 50%-99%, or 70%-100%, or up to 100%; and/or (e) a removal efficiency for peroxide of 40%-80%, 50%-70%, or 55%-70%, or up to 70%. In a further refinement of the method, embodiment or any one of the refinements thereof, the product may have a surface area of 80-135 $m^2$/g. In a further refinement of the method, embodiment or any one of the refinements thereof, the product may have a porosity of 70-82%. In a further refinement of the method, embodiment or any one of the refinements thereof, the product may have a pore volume of 1-2 mL/g. In any one of the embodiments or refinements above, the product may have intrinsic pores in the range of 17-30 nm and/or inter pores in the range of 2-32 microns.

In the method or any one of the embodiments/refinements above, the attapulgite is, or may be, thermally activated at a selected temperature for a duration at which collapse of the crystalline structure of the attapulgite does not occur.

In the method or any one of the embodiments/refinements above the attapulgite may have been spray dried or agglomerated (with or without a binder) prior to thermal activation or agglomerated during thermal activation. Spray drying techniques are known to those of ordinary skill in the art in the clay industry. One exemplary known method is to prepare a slurry of attapulgite and water, and utilize a spray dryer to disperse the slurry into droplets using high pressure nozzles, disks or the like. The temperature of the inlet and outlet air of the spray dryer depends on the dryer used. The droplets then become generally rounded agglomerations of attapulgite particles and are collected downstream of the drying chamber. Alternatively, other appropriate methods known in the art to spray dry clay or agglomerate clay (e.g, flash drying/heat treating, fluid bed drying, use of a high-shear mixer such as a pin mixer, paddle mixer, ribbon blender, rotary drum, etc.) may be used prior to thermal activation.

In the method or any one of the embodiments/refinements above the attapulgite may be free of acid activation. In the method or any one of the embodiments/refinements above the attapulgite may be free of residual acid (the attapulgite may be acid-free). In the method or any one of the embodiments/refinements above, the product may be free of acid activation. In the method or any one of the embodiments/refinements above, the product may be free of residual acid (the bleaching clay product may be acid-free).

Attapulgite/palygorskite is a magnesium aluminium phyllosilicate with the chemical formula $(Mg,Al)_2$ $Si_4O_{10}(OH)\cdot 4H_2O$. The percentages of the various impurity elements such as iron, calcium, sodium and potassium, as well as some relatively smaller amounts of lead and/or arsenic may vary depending on the deposit from which the attapulgite is sourced. The bulk chemistry of the attapulgite used as feed material impacts the extractable metal properties of the resulting bleaching clay product as such impurities can form extractable metals when the bleaching clay product comes into contact with oil. Thus, in the method or any one of the embodiments/refinements above, the attapulgite may have undergone a purification process to reduce impurities prior to the thermal activation disclosed herein, which may further reduce impurities in the bleaching clay product. Purification processes are known in the art. As used herein, purification process(es) that the attapulgite may have undergone to reduce impurities does(do) not include acid activation or acid washing.

In the method or any one of the embodiments/refinements above the product produced may have: (a) no more than 4 ppm soluble lead as measured by the FCC, or 0-4 ppm soluble lead as measured by the FCC, or less than 4 ppm soluble lead as measured by the FCC, or no more than 0.6 ppm soluble lead as measured by the FCC, or between 0-0.6 ppm soluble lead as measured by the FCC; and/or (b) no more than 1 ppm soluble arsenic as measured by the FCC, or 0-0.8 ppm soluble arsenic as measured by the FCC, or no more than 0.8 ppm soluble arsenic as measured by the FCC, or 0-0.8 ppm soluble arsenic as measured by the FCC.

Bleaching/Treating Process for Oil

In an application, the oil to be decolorized/bleached and any one of the disclosed products described above is combined in a suitable vessel to produce a slurry. A standard test method such as The American Oil Chemists' Society (AOCS) Cc8d-55 test method (this method determines the color of the test sample after treatment with alkali and a specified bleaching earth) can be used for bleaching process.

The loading may be that amount of the bleaching clay product sufficient to reduce the amount of red color pigment in the oil in a given the contact time such that a bleaching efficiency of at least 50% is achieved. In an embodiment, the loading may be in the range of 0.5-10 wt. %, or 2-4 wt. %, or about 3 wt. %. The contact time may be in the range of about 1 to about 30 minutes. In one embodiment, the contact time may be in the range of 4-10 minutes. In another embodiment, the contact time may be in the range of 4-6 minutes. In another embodiment, the contact time may be about 5 minutes.

The resulting slurry may be heated to and maintained at 80-130° C. or about 115-125° C. for a time period sufficient to reduce the amount of red color pigment in the oil using the disclosed bleaching clay product.

The bleached oil is then recovered from the slurry by any appropriate method known to those of skill in the art. For example, the bleached oil may be recovered by filtration.

In another application, the oil to be bleached and any one of the disclosed products described above is combined in a suitable vessel to produce a slurry. A standard test method such as The American Oil Chemists' Society (AOCS) Cc8d-55 test method can be used for the bleaching process, AOCS Official Method Cc 13b-45 for measuring color red, AOCS Official Method Cc 13d-55 for measuring chlorophyll, AOCS Surplus Method Cd 8-53 for measuring peroxide, AOCS Official Method Ca 17a-18 for measuring calcium, and AOCS Official Method Ca 17a-18 for measuring phosphorus. The loading may be that amount of the product sufficient to: (a) reduce the amount of phosphorus in the oil in the given contact time such that a removal efficiency of at least 50% is achieved for phosphorus and/or (b) reduce the amount of metal (e.g., calcium) in the oil in the given contact time such that a removal efficiency of at least 50% is achieved for the metal and/or (c) reduce the amount of chlorophyll in the oil in the given contact time such that a removal efficiency of at least 50% is achieved for chlorophyll and/or (d) reduce the amount of peroxide in the oil in the given contact time such that a removal efficiency of at least 50% is achieved for peroxide. The loading may be that amount of the product sufficient to result in the oil after bleaching/treating (treated oil) having a total metal content of 0 to less than 10 ppm, and/or a calcium content of 0 to less than 2 ppm, and/or a phosphorus content of 0 to less than 2 ppm and/or chlorophyll content of 0 to 0.5 ppm and/or peroxide content of 1 to less than 5 meq/kg. In an embodiment, the loading may be in the range of 0.5-10 wt. % or 0.5-4 wt. %, or 1-3 wt. %, or 1-1.5 wt. %. The contact time may be in the range of about 1 to about 35 minutes. In one embodiment, the contact time may be in the range of 4-35 minutes. In one embodiment, the contact time may be in the range of 4-10 minutes. In another embodiment, the contact time may be in the range of 4-6 minutes. In another embodiment, the contact time may be about 5 minutes. In another embodiment, the contact time may be about 30 minutes. Metal may include Calcium (Ca), magnesium (Mg), potassium (K), copper (Cu), iron (Fe), or mixtures thereof.

The resulting slurry may be heated to and maintained at 80-130° C. or 80-125° C. or about 120° C. or about 95° C. for a time period sufficient to: (a) reduce the amount of phosphorus in the oil in the given contact time such that a removal efficiency of at least 50% is achieved for phosphorus and/or (b) reduce the amount of metal (e.g., calcium) in the oil in the given contact time such that a removal efficiency of at least 50% is achieved for the metal and/or (c) reduce the amount of chlorophyll in the oil in the given contact time such that a removal efficiency of at least 50% is achieved for chlorophyll and/or (d) reduce the amount of peroxide in the oil in the given contact time such that a removal efficiency of at least 50% is achieved for peroxide. Such time period may be sufficient to result in the oil after bleaching/treating (treated oil) having: a total metal content of 0 to less than 10 ppm, and/or a calcium content of 0 to less than 2 ppm, and/or a phosphorus content of 0 to less than 2 ppm and/or chlorophyll content of 0 to 0.5 ppm and/or peroxide content of 1 to less than 5 meq/kg.

The bleached/treated oil is then recovered from the slurry by any appropriate method known to those of skill in the art. For example, the bleached/treated oil may be recovered by filtration.

As discussed earlier herein, oils suitable for bleaching/treating include edible oils and/or non-edible oils. Edible oil may include, but is not limited to, vegetable oil and/or (edible) animal derived oil. Edible vegetable oil may include, but is not limited to, canola, coconut, corn germ, cottonseed, olive, palm, peanut, rapeseed, safflower, sesame seed, soybean, sunflower or mixtures thereof. Edible animal-derived oil may include, but is not limited to, lard, tallow, fish oil or mixtures thereof. Non-edible oil may include, but is not limited to, non-edible vegetable oil, non-edible animal-derived oil, petroleum derived oil, mineral oil, insulating oil(s), rolling oil(s), waste oil(s), lubricant(s), grease(s), or mixtures thereof. Non-edible vegetable oil may include, but is not limited to, soybean oil, rapeseed oil, sunflower oil, palm oil, jojoba oil, linseed oil, castor oil, renewable diesel/HVO feedstock oil, or mixtures thereof. Renewable diesel/HVO feedstock oil may comprise, but is not limited to, vegetable oil(s) (e.g., non-edible vegetable oil or edible vegetable oil or mixtures thereof), used cooking oil(s), animal fat(s), DDGS (Distiller's Dried Grains with Solubles) oil, acid oil(s), distillate(s), distillation pitch(es), sludge oil(s), or mixtures thereof. For example, the feedstock oil for renewable diesel/HVO may comprise soybean oil. Nonedible animal-derived oil may include, but is not limited to, low grade tallow, neat's-foot oil(s), or mixtures thereof.

Description of Test Methods

Permeability

Permeability of thermal activated attapulgite in oil was measured according to Darcy's law using Canola oil under the constant flow condition.

$$Q = \frac{KADP}{\mu L}$$

Where Q=Flowrate (cc/sec)
μ=Oil viscosity (cP)
A=Cross-sectional area open for flow (cm$^2$)
DP=Pressure drop within the system (atm)
L=length of packed bed (cm)
K=Absolute permeability (Darcy)

X-Ray Diffraction (XRD)

Bulk powder XRD was analyzed utilizing a PANalytical X'Pert Pro diffractometer using Cu Kα radiation from 4-75° 2Θ with a step size of 0.008° 2Θ for 240 seconds/step. The resulting diffraction patterns were then analyzed using X'Pert HighScore Plus search-match software utilizing the ICDD PDF4+ database to identify the phases present.

Surface Area, Pore volume, Pore Size Distribution, Porosity

Surface area was measured by BET (Brunauer-Emmett-Teller) method. Pore volume and pore size distribution of a sample of material was determined by mercury porosimetry. The mercury porosimetry uses mercury as an intrusion fluid to measure pore volume and surface area of a (weighed) sample of material enclosed inside a sample chamber of a penetrometer. The sample chamber is evacuated to remove air from the pores of the sample. The sample chamber and penetrometer are filled with mercury. Since mercury does not wet the material surface, it must be forced into the pores by means of external pressure. Progressively higher pressure is applied to allow mercury to enter the pores. The required equilibrated pressure is inversely proportional to the size of the pores, only slight pressure is required to intrude the mercury into macropores, whereas much greater external pressure is required to force mercury into small pores. The penetrometer reads the volume of mercury intruded and the intrusion data is used to calculate pore size distribution, porosity, average pore size, surface area of the sample and total pore volume. A Micromeritics AutoPore IV 9500 was used to analyze the samples herein.

Assuming pores of cylindrical shape, a surface distribution may be derived from the pore volume distribution. An estimate of the total surface area of the sample of material can be made from the pressure/volume curve (Rootare, 1967) without using a pore model as $$A = \frac{1}{\gamma \cos\theta} \int\limits_{V_{Hg,0}}^{V_{Hg,max}} p\, dV$$

Where, A=total surface area
    $\gamma$=surface tension of the mercury
    $\theta$=angle of contact of mercury with the material pore wall
    p=external applied pressure
    V=pore volume From the function V=V(p) the integral may be calculated by means of a numerical method.

From the pressure versus the mercury intrusion data, the instrument generates volume and size distribution of pores following the Washburn equation (Washburn, 1921) as:

$$d_i = \frac{4\gamma \cos\theta}{P_i}$$

Where, $d_i$=diameter of pore at an equilibrated external pressure
    $\gamma$=surface tension of the mercury
    $\theta$=angle of contact of mercury with the material pore wall
    $P_i$=external applied pressure The average pore diameter is determined from cumulative intrusion volume and total surface area of the sample of material as:

$$D = \frac{4V}{S}$$

Where, D=average pore diameter
    V=total intrusion volume of mercury
    S=total surface area Porosity is the fraction of the total material volume that is taken up by the pore space. Porosity was calculated from mercury intrusion data.

Food Chemical Codex (FCC) Test Method for Soluble Arsenic

Soluble arsenic was measured for natural attapulgite and for thermally activated attapulgite using the Food Chemical Codex (FCC) Test Method for Clay (Bentonite/Smectite, FCC $5^{th}$ Edition Monograph). The amount of soluble arsenic was determined as directed under the Arsenic Limit Test (Appendix IIIB of the FCC $5^{th}$ Edition) using 5.0 mL of the Standard Arsenic Solution and a 25-mL aliquot of the following Sample Solution. Such Sample Solution is prepared by: transferring 8.0 g of the dried sample into a 250-mL beaker containing 100 mL of 1:25 hydrochloric acid, mixing, covering with a watch glass, and boiling gently, stirring occasionally, for 15 minutes without allowing excessive foaming; filtering the hot supernatant liquid through a rapid-flow filter paper into a 200-mL volumetric flask, and washing the filter with four 25-mL portions of hot, 1:25 hydrochloric acid, collecting the washings in the volumetric flask; and cooling the combined filtrates to room temperature, adding 1:25 hydrochloric acid to volume, and mixing.

Food Chemical Codex (FCC) Test Method for Soluble Lead

Soluble lead was measured for natural attapulgite and for thermally activated attapulgite using the Food Chemical Codex (FCC) Test Method for Clay (Bentonite/Smectite, FCC $5^{th}$ Edition Monograph). A Standard Preparation was prepared by, on the day of use, diluting 3.0 mL of Lead Nitrate Stock Solution (Flame Atomic Absorption Method under Lead Limit Test, Appendix IIIB) to 100 mL with water. Each milliliter of the Stand Preparation contains the equivalent of 3 µg of lead.

The Test Preparation was prepared by: transferring 3.75 g of dried sample into a 250-mL beaker containing 100 mL of 1:25 hydrochloric acid, stirring, covering with a watch glass, and boiling for 15 minutes; cooling to room temperature, and allowing the insoluble matter to settle; and decanting the supernatant liquid through a rapid-flow filter paper into a 400-mL beaker; washing the filter with four 25-mL portions of hot water, collecting the filtrate in the 400-mL beaker; and concentrating the combined extracts by gentle boiling to approximately 20 mL. (If a precipitate forms, the method instructs for the Test Preparation to add 2 to 3 drops of nitric acid, heat to boiling, and cool to room temperature.) The concentrated extracts were filtered through a rapid-flow filter paper into a 50-mL volumetric flask. The remaining contents of the 400-mL beaker were transferred through the filter paper and into the flask with water; and diluted to volume with water, and mixed. The Test Procedure instructs to determine the absorbances of the Test Preparation and the Standard Preparation at 284 nm in a suitable atomic absorption spectrophotometer equipped with a lead hollow-cathode lamp, deuterium arc background correction, and a single-slot burner, using an oxidizing air-acetylene flame. The absorbance of the Test Preparation is not greater than that of the Standard Preparation.

Test Method for Measuring Color Red

Color red was measured herein using AOCS (American Oil Chemists' Society) Official Method Cc 13b-45. This method determines color by comparison with glasses of known color characteristics.

Test Method for Measuring Chlorophyll

Chlorophyll was measured herein using AOCS (American Oil Chemists' Society) Official Method Cc 13d-55. This method is used to determine mg/kg (ppm) of chlorophyll-related pigments (predominantly pheophytin a) in oils from spectrophotometric absorption measurements at 630, 670, and 710 nm.

Test Method for Measuring Peroxide

Peroxide was measured herein using AOCS (American Oil Chemists' Society) Surplus Method Cd 8-53. This method determines all substances, in terms of milliequivalents of peroxide per 1000 grams of sample, that oxidize potassium iodide (KI) under the conditions of the test. The substances are generally assumed to be peroxides or other similar products of fat oxidation.

Test Method for Measuring Calcium

Calcium was measured herein using AOCS (American Oil Chemists' Society) Official Method Ca 17a-18. Solvent-diluted vegetable oils are analyzed for trace elements directly by Inductively Coupled Plasma Optical Emission Spectroscopy (ICP-OES).

Test Method for Measuring Phosphorus

Phosphorus was measured herein using AOCS (American Oil Chemists' Society) Official Method Ca 17a-18. Solvent-diluted vegetable oils are analyzed for trace elements directly by Inductively Coupled Plasma Optical Emission Spectroscopy (ICP-OES).

Examples 1-17

The bleaching clay products of Examples 1-17 each comprised thermally activated attapulgite. For clarity, the bleaching clay products disclosed herein may be used for decoloring and/or removal of impurities (e.g., phosphorus, metal, calcium, peroxide). As such, the novel products disclosed herein may be referred to as bleaching products, bleaching clay products or products, each of which may be used in applications to decolor and/or remove impurities. The bleaching clay products of Examples 1-8 were prepared using the commercially available Acti-Gel 208® (Active Minerals International, LLC) as feed material, and Examples 9-16 were prepared using the commercially available Min-U-Gel 400® (Active Minerals International, LLC) as feed material, and Example 17 was prepared using the commercially available Min-U-Gel 200® (Active Minerals International, LLC) as feed material. Acti-Gel 208, Min-U-Gel 400 and Min-U-Gel 200 are attapulgite products. The Acti-Gel 208 product is natural attapulgite that has been purified and spray dried. The Min-U-Gel 400 and Min-U-Gel 200 products are non-purified natural attapulgite that has been air classified. The major elemental compositions of Acti-Gel 208 and of Min-U-Gel 400 and of Min-U-Gel 200, as determined by wave-length dispersive x-ray fluorescence (XRF) analysis, is shown in Table 1.

TABLE 1

Major Oxide Composition of purified natural attapulgite product Acti-Gel 208 and air classified natural attapulgite Min-U-Gel 400, Min-U-Gel 200 used as feed materials (Ignited Basis).

| Total Chemistry as determined by XRF (expressed as oxides)[1] | Acti-Gel 208 ® | Min-U-Gel 400 ® | Min-U-Gel 200 ® |
|---|---|---|---|
| SiO$_2$ (wt. %) | 51.1 | 66.2 | 66.2 |
| Al$_2$O$_3$ (wt. %) | 10.8 | 12.1 | 11.7 |
| Fe$_2$O$_3$ (wt. %) | 3.5 | 4.2 | 4.0 |
| CaO (wt. %) | 2.2 | 2.8 | 2.9 |
| MgO (wt. %) | 8.4 | 9.9 | 9.7 |
| Na$_2$O (wt. %) | 0.5 | | |

TABLE 1-continued

Major Oxide Composition of purified natural attapulgite product Acti-Gel 208 and air classified natural attapulgite Min-U-Gel 400, Min-U-Gel 200 used as feed materials (Ignited Basis).

| Total Chemistry as determined by XRF (expressed as oxides)[1] | Acti-Gel 208 ® | Min-U-Gel 400 ® | Min-U-Gel 200 ® |
|---|---|---|---|
| K$_2$O (wt. %) | 0.6 | 1.1 | 1.1 |
| TiO$_2$ (wt. %) | 0.4 | 0.6 | 0.6 |
| P$_2$O$_5$ (wt. %) | 0.6 | 1.0 | 1.0 |
| Free Moisture, wt. % @ 220° F. (104° C.) | 9.0 | 13.5 | 12.5 |
| Residue (wet) % retained on 325 mesh screen | 0.01 | 0.005 | 6.9 |

[1]Although the elements are reported as oxides, they are actually present as complex aluminosilicates.

For each of examples 1-17, 100 g of the feed material was placed in a ceramic boat and heated in a muffle furnace for 30 minutes to thermally activate the attapulgite. During thermal activation, agglomeration of the attapulgite occurred. The temperature for thermal activation of each example is listed in Table 2. Table 2 also lists the surface area of the feed materials (Acti-Gel 208, Min-U-Gel) and the surface area of the bleaching clay products of Examples 1-17 (attapulgite post thermal activation), as the surface area does not appreciably change with thermal activation up to a certain temperature. Examples 1-8 were prepared using Acti-Gel 208 as the feed material, and Examples 9-16 were prepared using Min-U-Gel 400 as the feed material. Example 17 was prepared using Min-U-Gel 200 as the feed material. The surface area for each entry in Table 2 was measured by BET method.

TABLE 2

Thermal activation conditions for attapulgite feed materials and resulting surface area.

| Examples | Thermal Activation Temperature (° C.) | Surface Area (m$^2$/g) |
|---|---|---|
| Acti-Gel ® 208[1] | | 142 |
| Example 1 | 300 | 140 |
| Example 2 | 400 | 130 |
| Example 3 | 500 | 121 |
| Example 4 | 600 | 125 |
| Example 5 | 700 | 120 |
| Example 6 | 800 | 53 |
| Example 7 | 900 | 8 |
| Example 8 | 1000 | |
| Min-U-Gel ® 400[2] | | 142 |
| Example 9 | 300 | 140 |
| Example 10 | 400 | 130 |
| Example 11 | 500 | 126 |
| Example 12 | 600 | 123 |
| Examples 13 | 700 | 117 |
| Example 14 | 800 | 83 |
| Example 15 | 900 | 6 |
| Example 16 | 1000 | |
| Min-U-Gel ® 200[3] | | 98 |
| Example 17 | 700 | 88 |

[1]Active Minerals International, LLC
[2]Active Minerals International, LLC
[3]Active Minerals International, LLC FIG. 1 illustrates a comparison between the XRD patterns of the thermally activated attapulgite of Example 5 and the feed material (Acti-Gel 208) prior to thermal activation. FIG. 1 shows that the strong palygorskite diffraction peaks in natural attapulgite (Acti-Gel 208) become very weak after heat treatment at 700° C. This indicates that palygorskite crystal structure rearranges and becomes disordered due to the loss of structural water at high temperature. Amorphization of the palygorskite crystal structure also reduces surface area. When the temperature is over 900° C., palygorskite crystal structure completely collapses and results in very low surface area.

Figure 2:
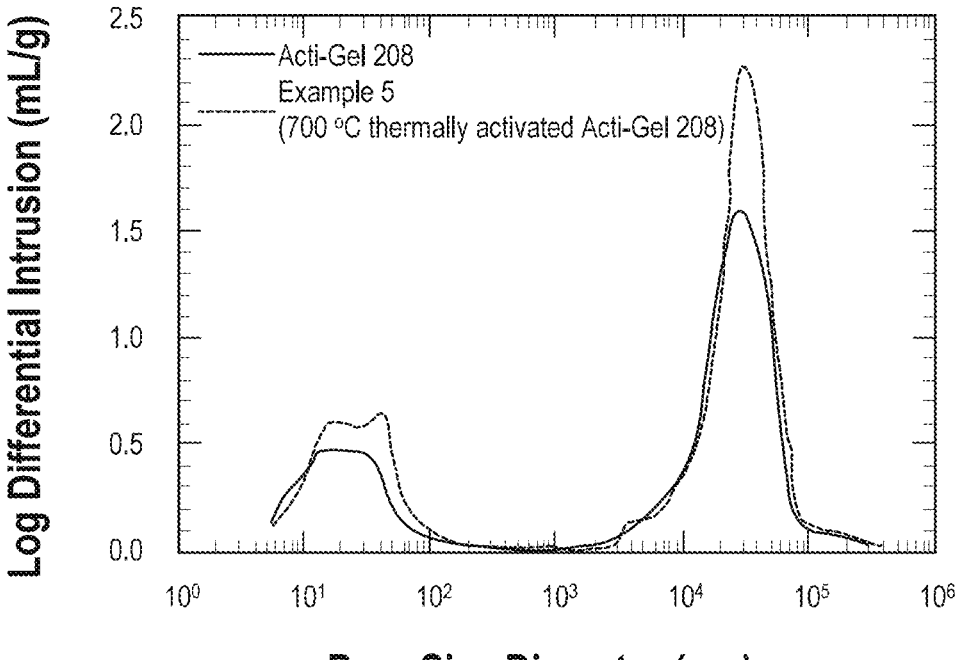
FIG. 2 is a graph showing the pore size distribution of Acti-Gel 208 (natural attapulgite that has been purified and spray dried but not thermally activated) and the thermally activated Acti-Gel 208 of Example 5.
Figure 3:
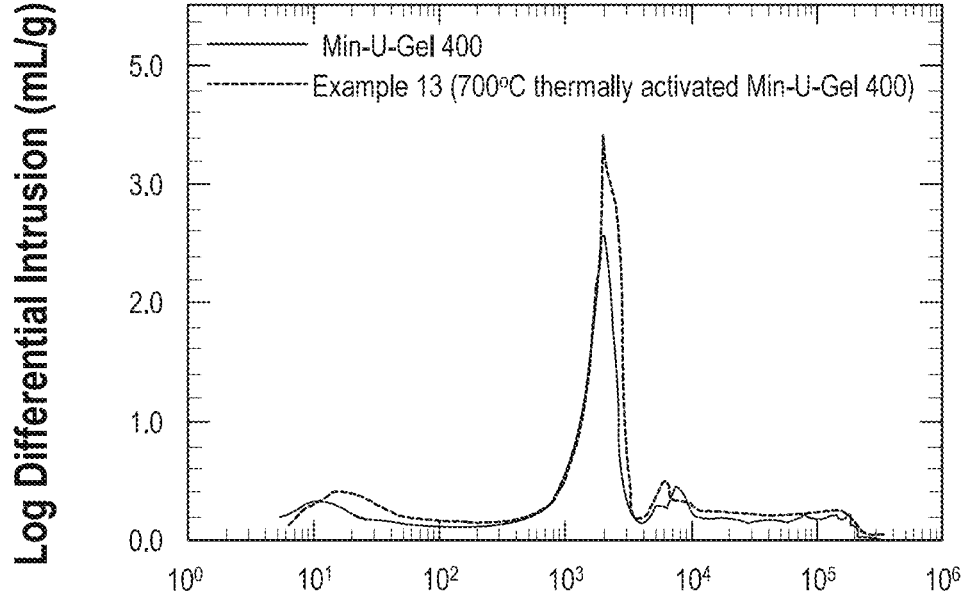
FIG. 3 is a graph showing the pore size distribution of Min-U-Gel 400® (natural attapulgite that has been air classified but has not been thermally activated) and the thermally activated Min-U-Gel 400 of Example 13.

FIG. 2 shows the pore size distribution of a spray dried and purified natural attapulgite (Acti-Gel 208) before thermal activation and after it has been thermally activated (Example 5) as measured by mercury intrusion. Similarly, FIG. 3 shows the pore size distribution of (an air classified) natural attapulgite (Min-U-Gel 400) before thermal activation and after it has been thermally activated (Example 13) as measured by mercury intrusion. As used herein, an "intrinsic pore" is a pore that is (a) disposed in the surface of a particle of attapulgite or (b) disposed in the structure of a particle of attapulgite. As used herein an "inter pore" is a pore that is (a) disposed between particles of attapulgite or (b) disposed between agglomerated particles of attapulgite.

In FIG. 2, the bimodal distribution shows small intrinsic pores around 25 nanometers (nm), and large inter pores around 30 microns for the spray dried and purified natural attapulgite of Acti-Gel 208.

In FIG. 3, the bimodal distribution shows small intrinsic pores around 15 nm, and large inter pores around 2 microns for the air classified natural attapulgite of Min-U-Gel 400.

As determined for Examples 5 and 13, pore volume was greater than 1.4 mL/g, porosity was greater than 73%. For the thermally activated, spray dried and purified attapulgite of Example 5, the bimodal distribution of FIG. 2 shows the small intrinsic pores around 30 nm, and large inter pores of about 32 microns. For the thermally activated, air classified attapulgite of Example 13, the bimodal distribution of FIG. 3 shows the small intrinsic pores around 17 nm and the large inter pores of about 2 microns. For the thermally activated attapulgite, (e.g., Example 5 and Example 13) the inventors have found that the smaller intrinsic (nano)pores (17-30 nm) are effective to adsorb pigments in the oil since they are closer to the diameter of the pigments. For the thermally activated attapulgite, (e.g., Example 5 and Example 13) the inventors have found that the large inter pores (2-32 microns) facilitate oil to flow through attapulgite particles and increase attapulgite permeability in oil.

Table 3 illustrates the pore volume and porosity of the natural attapulgite of Acti-Gel 208 (purified and spray dried) and of Min-U-Gel 400 (non-purified and air classified) as compared to thermally activated attapulgite (Example 5 and Example 13). Table 3 indicates that the attapulgite structure becomes more porous after high temperature thermal activation with increasing pore volume and porosity.

TABLE 3

| Pore volume and porosity of natural attapulgite (Acti-Gel 208 and Min-U-Gel 400) and thermally activated attapulgite (Examples 5, 13 and 17). | | | | | |
| --- | --- | --- | --- | --- | --- |
| Sample | Total intrusion pore volume (mL/g) | Porosity (%) | $d_{10}$ (μm) | $d_{50}$ (μm) | $d_{90}$ (μm) |
| Acti-Gel ® 208 | 1.4931 | 75.8 | | | |
| Example 5 | 1.7737 | 80.5 | | | |
| Min-U-Gel ® 400 | 1.4806 | 73.6 | | | |
| Example 13 | 1.8305 | 78.2 | | | |
| Min-U-Gel ® 200 | | | 6.43 | 18.2 | 63.7 |
| Example 17 | 1.1853 | 72.0 | 9.22 | 30.6 | 93.3 |

Figure 4:
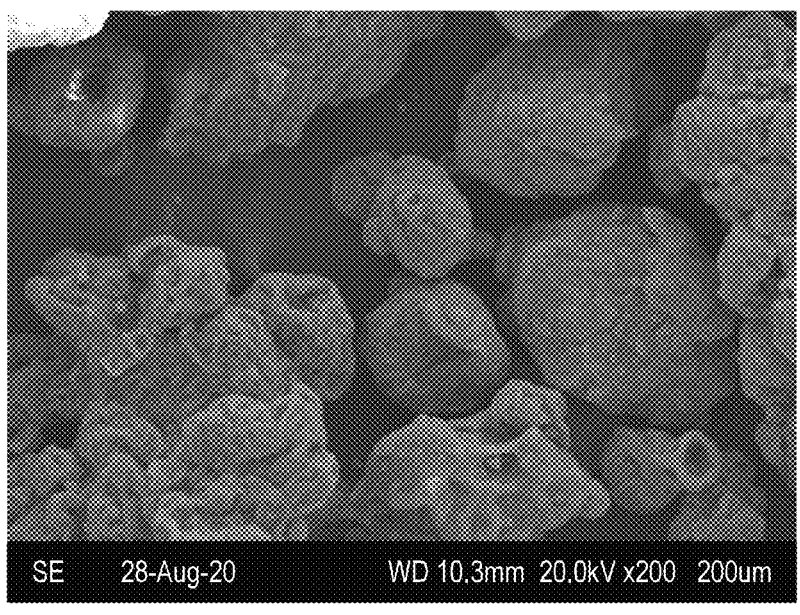
FIG. 4 is a Scanning Electron Microscope (SEM) image of Example 5 at low magnification (×200)
Figure 5:
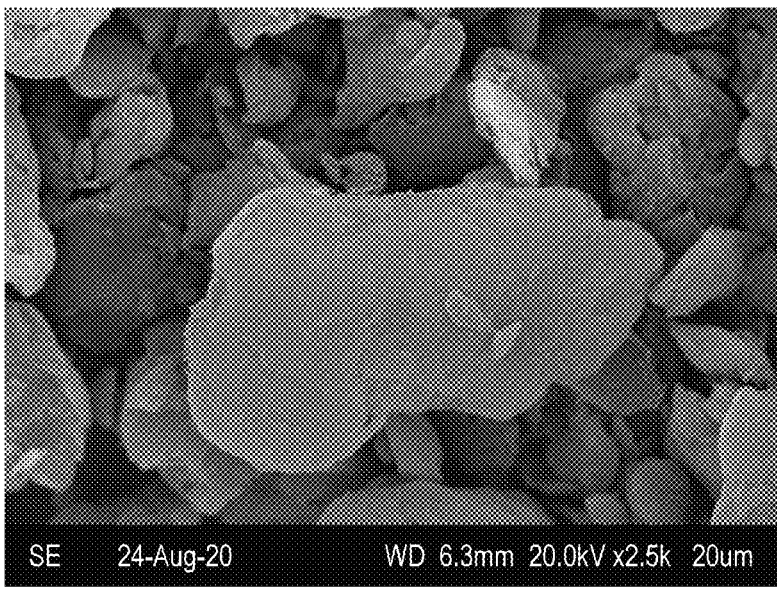
FIG. 5 is a SEM image of Example 13 at low magnification (×2500)
Figure 6:
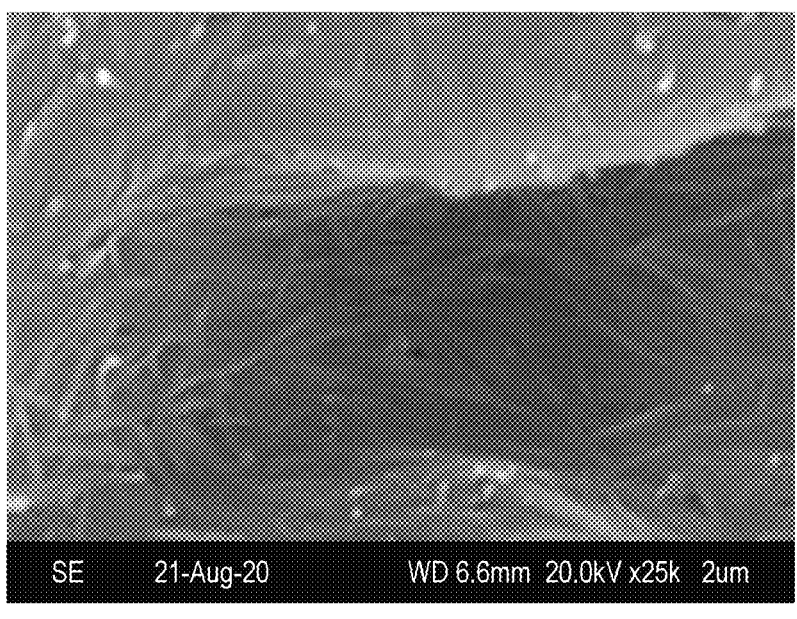
FIG. 6 is a SEM image of Example 5 at high magnification (×25000)
Figure 7:
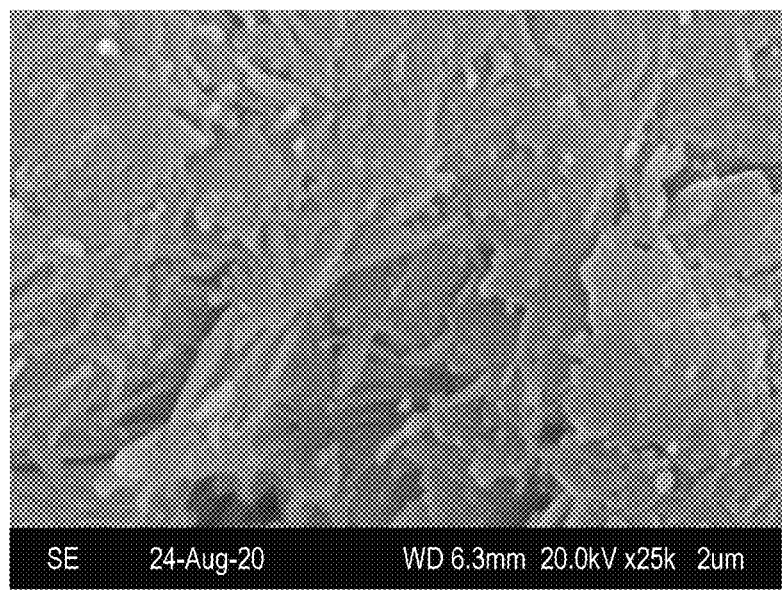
FIG. 7 is a SEM image of Example 13 at high magnification (×25000)

FIG. 4 and FIG. 5 are Scanning Electron Microscope (SEM) images of Example 5 and Example 13 at low magnification (×200, ×2500 respectively). The SEM images of FIG. 4 and FIG. 5 show that the thermally activated attapulgite particles are in a generally rounded granular form in the spray dried purified attapulgite and irregular shapes in the non-purified air classified attapulgite. FIG. 6 and FIG. 7 are SEM images of Example 5 and Example 13 at high magnification (×25000). These high magnification SEM images indicate that attapulgite rods remain intact after high temperature treatment at 700° C. even though the palygorskite crystal structure becomes amorphous.

Example 18

Permeability of thermally activated attapulgite in oil was measured according to Darcy's law using Canola oil under the constant flow condition. A commercially available activated bleaching clay (F-105, EP Minerals, LLC) was also measured for comparison.

Table 4 shows the permeability in oil of the commercially available activated bleaching clay (F-105), the commercially available Acti-Gel 208, the commercially available Min-U-Gel 400, and Examples 1-6 and Examples 9-14 and 17. Table 4 illustrates that the permeability of the thermally activated attapulgite of Examples 1-6 is significantly higher than the commercially available activated bleaching clay. The comparison of Example 5 to Example 13 shows that thermal activation of attapulgite that has undergone agglomeration (e.g., spray drying) prior to thermal activation (Example 5) increases the permeability of the resulting bleaching clay product as compared to thermal activation of attapulgite that has not undergone agglomeration (Example 13) prior to thermal activation. Increasing the thermal activation temperature increases permeability due to more porous structure as indicated by porosimetry results.

TABLE 4

| Permeability of thermal activated attapulgite (Examples 1-6 and 9-14 and 17) in oil. | | |
| --- | --- | --- |
| Sample | Thermal Activation Temperature (° C.) | Permeability in Oil (mDarcy) |
| Activated bleaching clay[1] | | 9.11 |
| Acti-Gel ® 208 | | 700 |
| Example 1 | 300 | 903.6 |
| Example 2 | 400 | 1525.7 |
| Example 3 | 500 | 1512.9 |
| Example 4 | 600 | 2266.2 |
| Example 5 | 700 | 2125.1 |
| Example 6 | 800 | 2927.8 |
| Min-U-Gel ® 400 | | 34.6 |
| Example 9 | 300 | 41.5 |
| Example 10 | 400 | 37.7 |
| Example 11 | 500 | 36.1 |
| Example 12 | 600 | 43.3 |
| Example 13 | 700 | 53.3 |
| Example 14 | 800 | 45.6 |
| Example 17 | 700 | 190.2 |

[1]F-105, EP Engineered Clays Corporation
[2] Active Minerals International, LLC

Example 19

Table 5 shows the Food Chemical Codex (FCC) soluble metals for natural attapulgite (Acti-Gel 208) that has been purified and natural attapulgite (Min-U-Gel 400) that has not undergone a purification process, and the thermally activated attapulgite of Examples 5 and 13. Table 5 illustrates that thermally activated attapulgite has low soluble arsenic and lead measured by the standard Food Chemical Codex (FCC) test methods for clay (Bentonite/Smectite, FCC 5th Edition Monograph). These soluble heavy metals are well below FCC limits (5 ppm for arsenic, 40 ppm for lead) for food applications.

TABLE 5

Food Chemical Codex (FCC) soluble metals for natural attapulgite and thermally activated attapulgite.

| Sample | FCC Soluble Arsenic (ppm) | FCC Soluble Lead (ppm) |
|---|---|---|
| Acti-Gel ® 208[1] | 0.07 | 3.543 |
| Example 5 | 0.06 | 0.568 |
| (Acti-Gel 208 | | |
| thermally activated | | |
| at 700° C. | | |
| Min-U-Gel ® 400[2] | 0.052 | 2.963 |
| Example 13 | 0.792 | 3.770 |
| (Min-U-Gel ®400 | | |
| thermally activated | | |
| at 700° C.) | | |

[1]Active Minerals International, LLC

[2]Active Minerals International, LLC

Example 20

Bleaching efficiency was measured according to The American Oil Chemists' Society (AOCS) standard test method Cc8d-55. For each bleaching clay product of Examples 1-17, the oil and the bleaching clay product was combined in a suitable vessel to produce a slurry. In each example, the oil was an edible oil (soybean oil), and the loading was 3 wt. % bleaching clay product to 97 wt. % oil. The slurry was heated to 120° C. The contact time for each example was 5 minutes at atmospheric pressure and at a temperature of 120° C. after which the bleaching clay product was separated from the oil by filtering.

Figure 8:
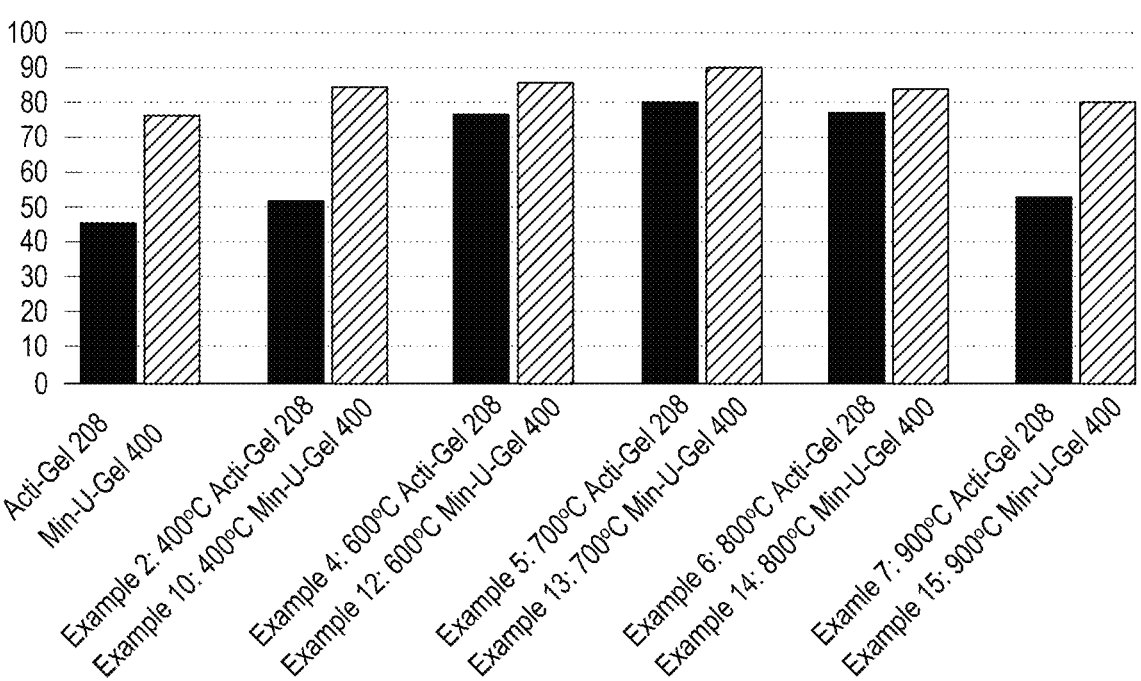
FIG. 8 is a graph illustrating bleaching efficiency.

Table 6 shows that thermal activation increases bleaching efficiency. This is due to increased adsorption capacity in attapulgite by removal of water molecules in the channels of palygorskite crystal structure by thermal treatment. The highest bleaching efficiency is achieved around 600-800° C. thermal activation (heating). Further increase of the thermal activation temperature reduces bleaching efficiency as the palygorskite crystal structure begins to collapse or completely collapses. "Lovibond red" measures the carotenes present in the oil. The color measurements in Table 6 were read by the Lovibond® colorimeter. FIG. 8 further illustrates the bleaching efficiency (%) of the Examples of Table 6.

$$\text{Bleaching efficiency} = \frac{(\text{Lovibond red before bleaching} - \text{Lovibond red after bleaching}) \times 100}{\text{Lovibond red before bleaching}}$$

TABLE 6

Bleaching Efficiency Results for Bleaching Clay Products

| Samples | Thermal Activation Temperature (° C.) of the Material | Lovibond Red Before Bleaching | Lovibond Red After Bleaching | Bleaching Efficiency (%) |
|---|---|---|---|---|
| Acti-Gel ® 208[1] | | 9.1 | 5.0 | 45 |
| Example 2 | 400 | 9.1 | 4.4 | 52 |
| Example 4 | 600 | 9.1 | 2.1 | 77 |
| Example 5 | 700 | 9.0 | 1.9 | 79 |
| Example 6 | 800 | 8.6 | 1.9 | 78 |
| Example 7 | 900 | 8.1 | 3.8 | 53 |
| Example 8 | 1000 | 10.4 | 8.3 | 20 |
| Min-U-Gel ® 400 | | 8.3 | 2.0 | 76 |
| Example 10 | 400 | 8.3 | 1.3 | 84 |
| Example 12 | 600 | 8.3 | 1.2 | 86 |
| Example 13 | 700 | 9.9 | 1.0 | 90 |
| Example 14 | 800 | 9.3 | 1.5 | 84 |
| Example 15 | 900 | 9.3 | 1.9 | 80 |
| Example 17 | 700 | 8.6 | 1.4 | 84 |

Measurements were made on another sample of unbleached soybean oil and recorded in Table 7. A portion of the sample soybean oil was bleached with Example 13 and measurements were recorded in Table 7. For comparison, another portion of the sample soybean oil was bleached with a commercial acid activated bleaching clay and measurements were recorded in Table 7.

As shown in Table 7, bleaching performance of thermally activated attapulgite in the soybean oil is similar to the commercial acid activated bleaching earth product (Oil-Dri Supreme™ B81). Besides removing color red and chlorophyll, thermally activated attapulgite also removes peroxide, phosphorus, and calcium very effectively in soybean oil. Based on these results, thermally activated attapulgite can also be used to remove phosphorus and metals in hydrotreated vegetable oil (HVO)/renewable diesel feedstock pretreatment.

TABLE 7

Comparison of thermally activated attapulgite with commercial acid activated bleaching earth product.

| Samples | Chlorophyll (ppm) | Peroxide (meq/kg) | Calcium (ppm) | Phosphorus (ppm) | Lovibond red |
|---|---|---|---|---|---|
| Unbleached soybean oil | 0.29 | 5.2 | 59.84 | 291.8 | 10.7 |
| Soybean oil bleached with Example 13 | −0.02 | 2.0 | <0.5 | <0.5 | 3.0 |
| Soybean oil bleached with Commercial acid activated bleaching clay[1] | 0.01 | 2.0 | <0.5 | <0.5 | 4.0 |

[1]Supreme ™ B81, Oil-Dri Corporation of America

Table 8 illustrates the exemplary bleaching efficiency and the exemplary chlorophyll, peroxide, calcium, phosphorus removal efficiency in the sample of soybean oil, as calculated below and using the values in Table 7.

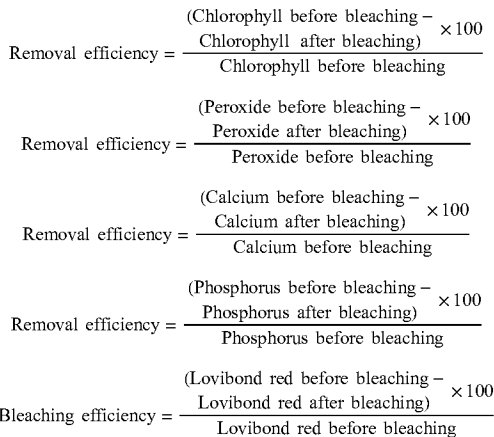

$$\text{Removal efficiency} = \frac{\begin{array}{c}(\text{Chlorophyll before bleaching} - \\ \text{Chlorophyll after bleaching})\end{array} \times 100}{\text{Chlorophyll before bleaching}}$$

$$\text{Removal efficiency} = \frac{\begin{array}{c}(\text{Peroxide before bleaching} - \\ \text{Peroxide after bleaching})\end{array} \times 100}{\text{Peroxide before bleaching}}$$

$$\text{Removal efficiency} = \frac{\begin{array}{c}(\text{Calcium before bleaching} - \\ \text{Calcium after bleaching})\end{array} \times 100}{\text{Calcium before bleaching}}$$

$$\text{Removal efficiency} = \frac{\begin{array}{c}(\text{Phosphorus before bleaching} - \\ \text{Phosphorus after bleaching})\end{array} \times 100}{\text{Phosphorus before bleaching}}$$

$$\text{Bleaching efficiency} = \frac{\begin{array}{c}(\text{Lovibond red before bleaching} - \\ \text{Lovibond red after bleaching})\end{array} \times 100}{\text{Lovibond red before bleaching}}$$

TABLE 8

Comparison of thermally activated attapulgite with
commercial acid activated bleaching earth product.

| Samples | Chlorophyll Removal Efficiency (%) | Peroxide Removal Efficiency (%) | Calcium Removal Efficiency (%) | Phosphorus Removal Efficiency (%) | Lovibond Red (%) |
|---|---|---|---|---|---|
| Unbleached soybean oil | | | | | |
| Soybean oil bleached with Example 13 | 100 | 62 | +99 | +99.8 | 72 |
| Soybean oil bleached with Commercial acid activated bleaching clay[1] | 97 | 62 | +99 | +99.8 | 63 |

[1]Supreme ™ B81, Oil-Dri Corporation of America

INDUSTRIAL APPLICABILITY

In general, the foregoing disclosure finds utility in the removal of red color pigments and chlorophyll and impurities (peroxide and/or phosphorus and/or metals and/or calcium) contained in edible and non-edible oils. The foregoing disclosure also finds utility in the removal of red color pigments and/or chlorophyll and/or peroxide and/or phosphorus and/or metals and/or calcium in hydrotreated vegetable oil (HVO)/renewable diesel feedstock oil pretreatment. Typically, acid activated bleaching clays have been used to adsorb the color pigments. Although such acid activated bleaching clays may be beneficial, the bleaching process time of such clays is relatively long because bleaching clays, including acid activated bleaching clays, have very low permeability in oil. Usually, permeability in oil is inversely related to the bleaching clay's bleaching efficiency as smaller particle sizes typically result in higher bleaching activity but lower permeability. Slow permeability is undesirable because it substantially lowers processing throughput rates.

Historically, oil refiners, in choosing a bleaching clay have been typically forced to compromise between getting the most decolorization per amount of bleaching clay versus processing speed. Moreover, use of acid activated bleaching clays (e.g., calcium bentonite and the like) comes with other drawbacks as well such as undesirable amounts of soluble metals that may be transferred into the decolorized oil during processing.

The novel bleaching clay products disclosed herein can be used as an adsorbent for oil bleaching (e.g., decolorizing)

edible and/or non-edible oil, and/or for removing phosphorus and/or metals (e.g., calcium) and/or peroxide in oil or in HVO/renewable diesel feedstock pretreatment. Such bleaching clay products have high permeability in oil (relative to other bleaching clays) and high bleaching efficiency, which significantly reduces bleaching process time. Furthermore, compared to the acid activated bleaching clays, the bleaching clay products disclosed herein do not require the wet processes associated with high production cost and other additional costs such as chemicals and waste disposal The thermal activation undergone by the attapulgite of the bleaching products disclosed herein removes residual organic contaminants from the attapulgite, thereby making the resulting bleaching products more desirable for use in bleaching edible oils. Furthermore, the novel products disclosed herein are free of residual acid. In other words, the products disclosed herein are acid-free.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A product comprising:
   attapulgite, wherein the attapulgite has been thermally activated,
   wherein the product has a permeability in an oil in the range of 0.04-3 darcy,
   wherein the product has a surface area of 45-140 m²/g,
   wherein the product has a removal efficiency in the oil for phosphorus of 50% to 100%,
   wherein the product has a removal efficiency in the oil for a metal of 50% to 100%,
   wherein the product is acid-free or free of residual acid, and
   wherein the oil comprises a feedstock oil for hydrotreated vegetable oil (HVO) or renewable diesel.

2. The product of claim 1, wherein further the attapulgite has a permeability in the range of 0.04-3 darcy.

3. The product of claim 1, wherein the metal includes calcium, magnesium, potassium, copper, or iron.

4. The product of claim 3, wherein the product has a removal efficiency in the oil for peroxide of 50% to 100%.

5. The product of claim 3, wherein the product has a removal efficiency in the oil for chlorophyll of 50% to 100%.

6. The product of claim 3, wherein the product has a bleaching efficiency in the oil for Lovibond red of 65% to 100%.

7. The product of claim 1, wherein:

the product has the removal efficiency in the oil for phosphorus of 50% to 100% that leaves less than 2 ppm phosphorus content in the oil, and/or the product has the removal efficiency in the oil for the metal of 50% to 100% that leaves less than 10 ppm total metal content in the oil.

8. The product of claim 3, wherein the attapulgite that has been thermally activated has a porosity of 70-85% and/or a pore volume of 1-2 mL/g.

9. The product of claim 8, wherein the attapulgite that has been thermally activated has a $d_{90}$ of 65-95 µm.

10. The product of claim 3, wherein the product has intrinsic pores in the range of 17-30 nm and/or inter pores in the range of 2-32 microns.

11. The product of claim 1, wherein the surface area is 80-140 m²/g.

12. The product of claim 1, wherein further the attapulgite has a permeability in the range of 0.04-0.07 darcy.

13. The product of claim 1, wherein further the attapulgite has a permeability in the range of 0.04-0.19 darcy.

14. The product of claim 1, wherein further the attapulgite has a permeability in the range of 1-3 darcy.

15. The product of claim 1, wherein further the attapulgite has a permeability in the range of 1.5-3 darcy.

16. The product of claim 1, wherein the metal includes calcium.

17. The product of claim 1, wherein the product has the removal efficiency in the oil for phosphorus of 50% to 100% that leaves less than 2 ppm phosphorus content in the oil.

18. The product of claim 1, wherein the product has the removal efficiency in the oil for the metal of 50% to 100% that leaves less than 10 ppm total metal content in the oil.

19. The product of claim 1, wherein the attapulgite that has been thermally activated has:

a porosity of 70-85%, a pore volume of 1-2 mL/g, a $d_{90}$ of 65-95 µm, or any combination thereof.

20. The product of claim 19, wherein the product has intrinsic pores in the range of 17-30 nm and/or inter pores in the range of 2-32 microns.

21. The product of claim 3, wherein the attapulgite that has been thermally activated has:

a porosity of 70-85%, a pore volume of 1-2 mL/g, and a $d_{90}$ of 65-95 µm.

* * * * *